Patented Dec. 19, 1939

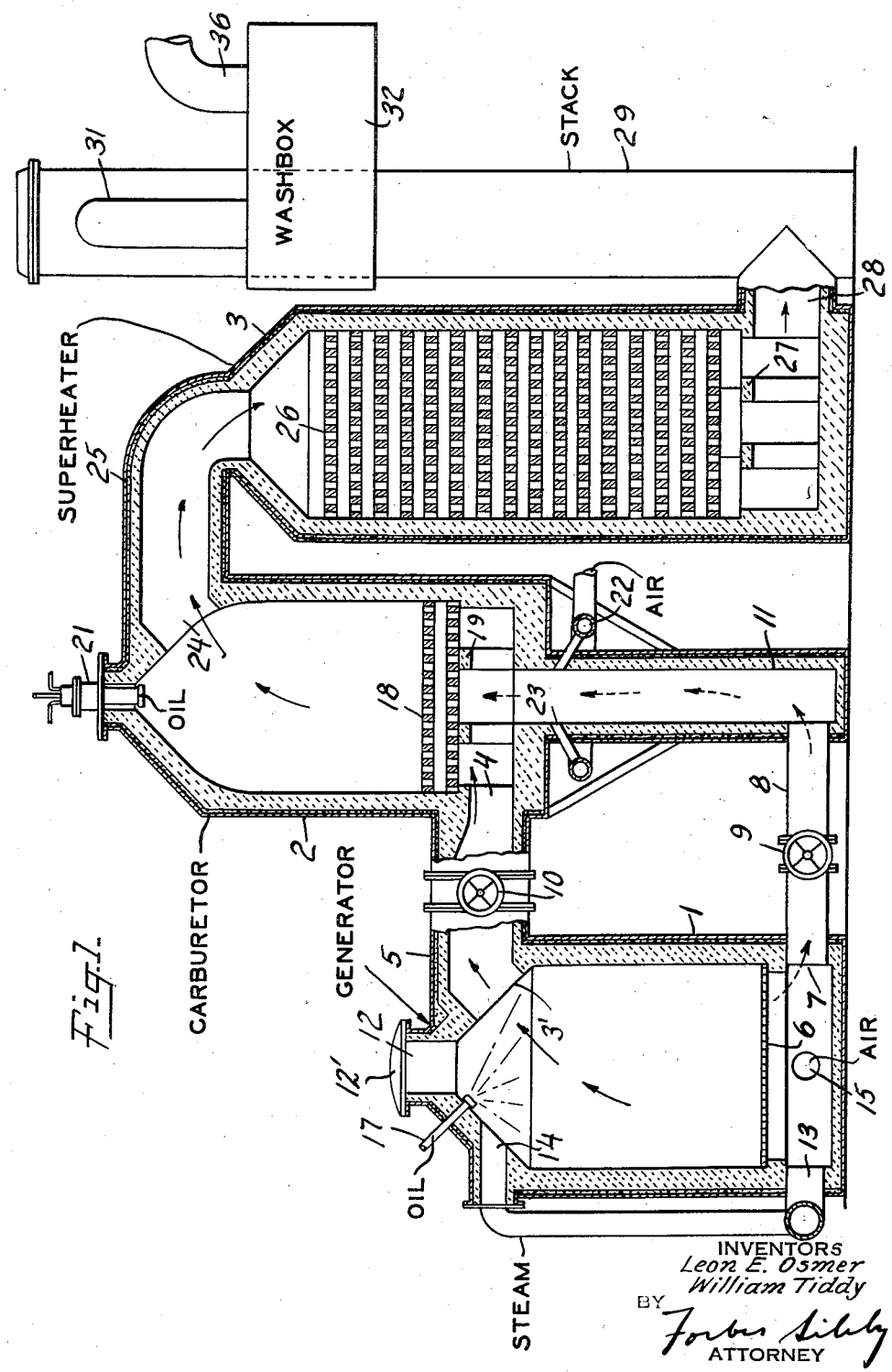

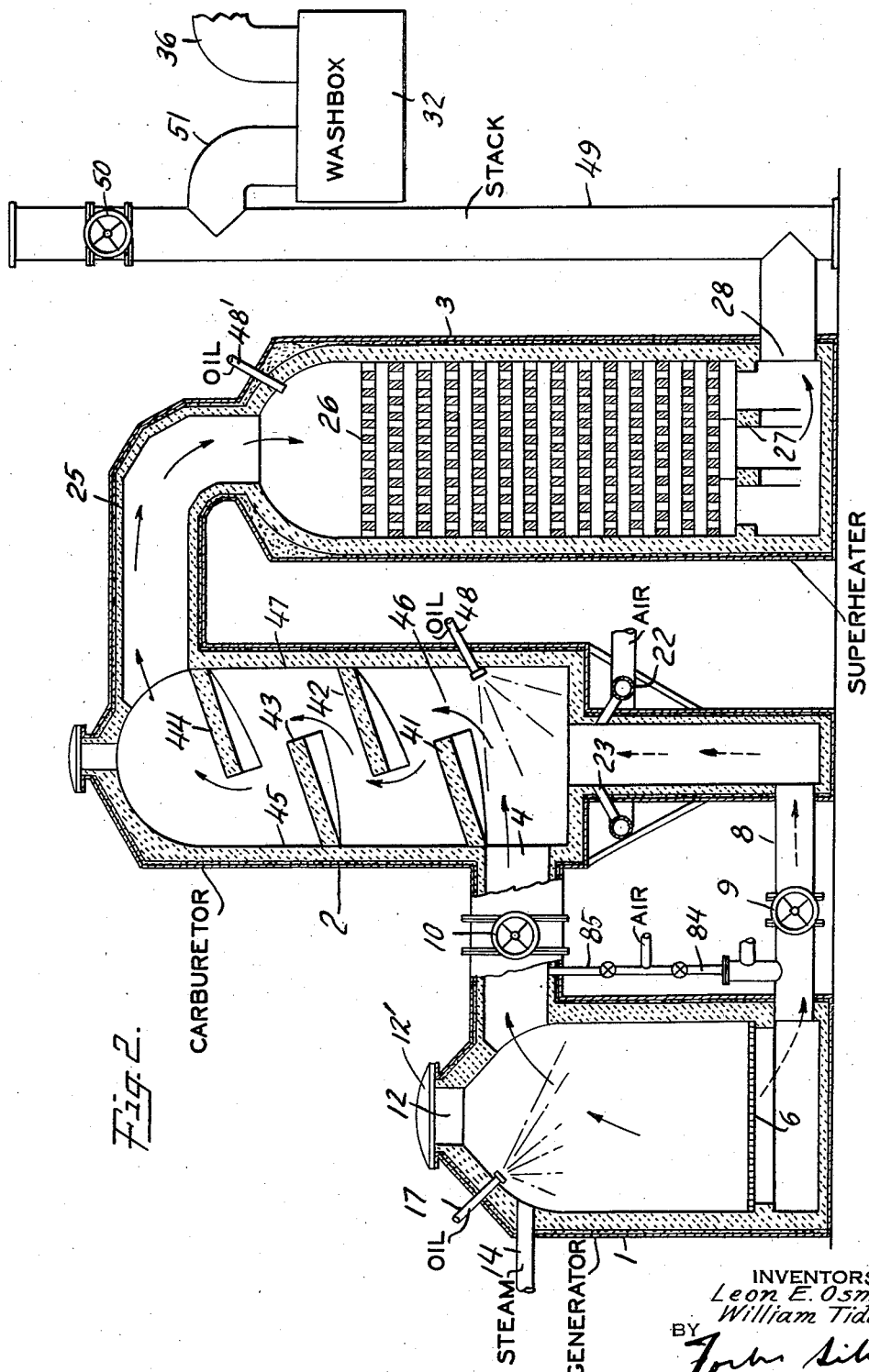

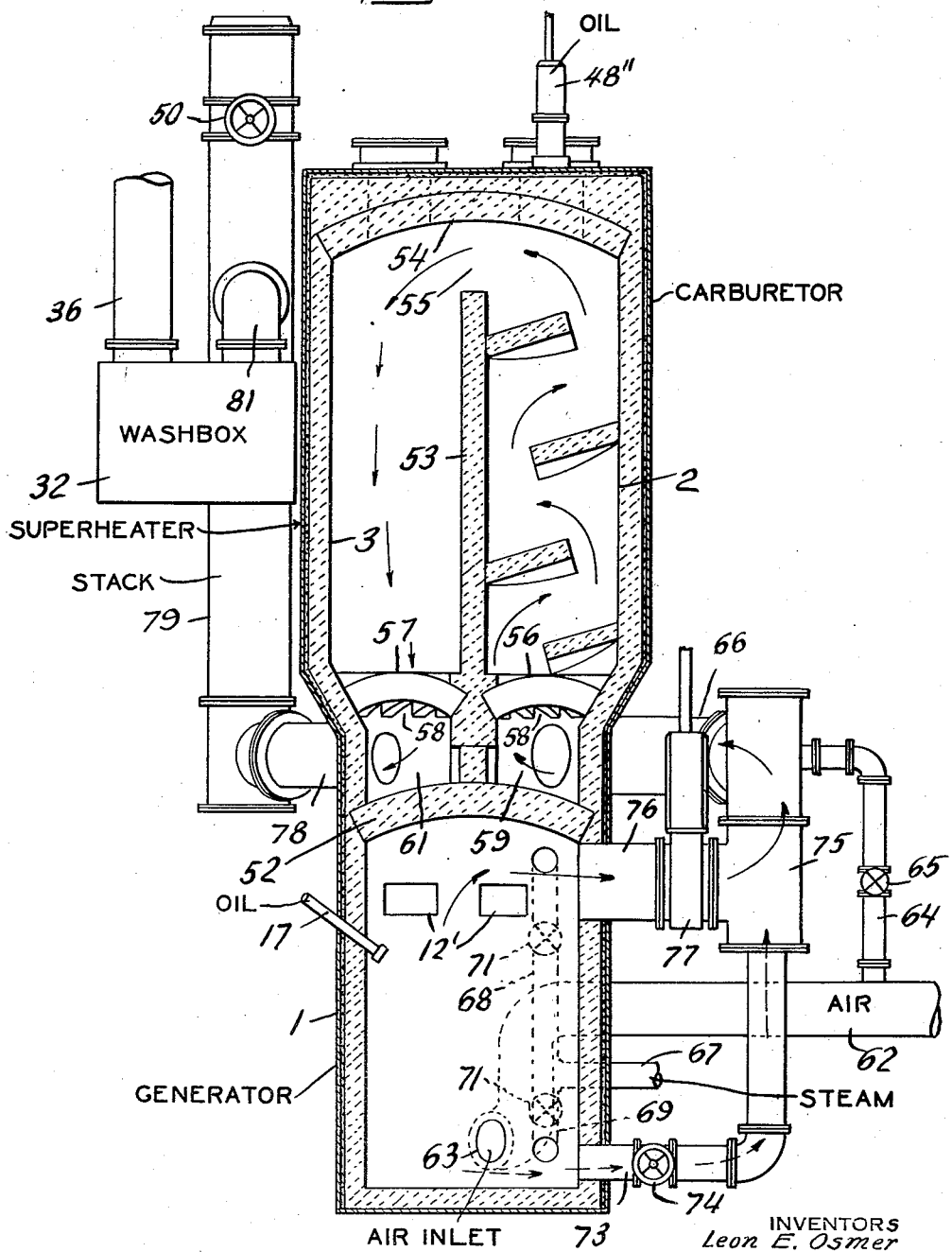

2,183,845

UNITED STATES PATENT OFFICE 2,183,845

PROCESS OF MAKING HIGH BRITISH THERMAL UNITS CARBURETED WATER GAS

Leon E. Osmer, Western Springs, Ill., and William Tiddy, New York, N. Y., assignors to Semet-Solvay Engineering Corporation, New York, N. Y., a corporation of New York Application October 22, 1936, Serial No. 106,996

8 Claims. (Cl. 48—205)

This invention relates to carbureted water gas manufacture and more particularly to the manufacture of carbureted water gas of high B. t. u.

In many localities natural gas is employed as the gaseous fuel for heating purposes. In such localities the burner appliances are adjusted to efficiently burn natural gas. Natural gas has a high calorific content, e. g., from 800 to 1,000 B. t. u. per cubic foot. Burners adjusted for burning natural gas cannot efficiently be used to burn gases of substantially lower B. t. u., such for example, as the ordinary carbureted water gas which is of about 525 to 540 B. t. u. Accordingly, in localities where natural gas is distributed, the problem arises of meeting peak loads and emergency service requiring an amount of gas during certain time intervals in excess of the maximum amount of natural gas normally available in such localities during such intervals.

An object of this invention is to provide a process of making carbureted water gas of high calorific content, e. g., 800 to 1,000 B. t. u. per cubic foot which can be used instead of natural gas or admixed with natural gas and efficiently burned in burners adjusted for burning natural gas.

Other objects and features of the invention will be made evident as the description progresses.

In the manufacture of high B. t. u. water gas it is important to provide for the utilization of relatively large quantities of liquid hydrocarbon such as gas oil to enrich the water gas. For example, as compared with 2¾ to 3 gallons of gas oil used in making 1000 cubic feet of 525—540 B. t. u. gas, in the manufacture of 800 B. t. u. gas from 8¾ to 9 gallons of gas oil are needed, and in making 1000 B. t. u. gas 11 to 12 gallons of gas oil are required. The present invention provides for a more uniform supply of heat to the heating surfaces and for effective utilization of such heat to gasify the relatively large quantities of gas oil employed to carburet the water gas to produce the desired high B. t. u. gas.

The generator, carburetor and superheater are connected, with the top of the generator communicating with the base of the carburetor, and the top of the carburetor communicating with the top of the superheater, so that flow takes place from the generator up through the carburetor and down through the superheater. This method of flow through the checkerbrick work in the superheater results in improved heat transfer from the hot checkerbrick in the superheater to the gases passing thereover, as compared with prior conventional flow through the superheater involving the upward flow of gas therethrough. The generator is connected with the carburetor so that both the uprun and downrun water gas may be passed from the generator through the carburetor, where the gas is enriched with oil, the resultant carbureted water gas being passed through the superheater where fixing of the gas takes place.

In carrying out the process of this invention, the fuel bed in the generator is first blasted with air or other oxygen-containing gas and the resultant blast gases burned in the carburetor and superheater to heat these chambers. This blasting cycle is continued until the fuel bed reaches an incandescent state suitable for the following water gas step. Upon the completion of the blasting cycle, steam is passed through the fuel bed and the resultant water gas introduced into the carburetor, where it is enriched with gas oil, introduced in amount such that a carbureted water gas of a B. t. u. substantially in excess of 540 is produced, e. g., a gas of 800 to 1,000 B. t. u. results. The carbureted water gas passes up through the carburetor and down through the superheater and is fixed in the latter chamber.

At the completion of this step a suitable gas making fluid, such as steam or air, is passed through the fuel bed, and the resultant combustible gas introduced into the carburetor. Secondary air is simultaneously added to the carburetor to support combustion of this combustible gas and the gas burned to reheat the carburetor to a temperature suitable for the cracking and gasification of gas oil. Steam is then passed through the fuel bed preferably in a direction reverse to that of the steam employed in the preceding carbureted water gas making step, and the resultant water gas introduced into the carburetor, where it is enriched with gas oil introduced thereinto in amount such that a carbureted water gas of a B. t. u. substantially in excess of 540 results. The carbureted water gas from this and the preceding step are subjected to the usual purification treatment and are mingled to produce the desired high B. t. u. gas product. A purge run may follow this step, and upon completion of the purge the cycle of steps hereinabove briefly outlined may be repeated. Operating in this manner, a high B. t. u. gas which can be effectively used as a substitute for natural gas will be obtained.

In the accompanying drawings forming a part of this specification and showing for purposes of exemplification preferred arrangements of carbureted water gas equipment for practicing this invention, without limiting the claimed invention to such illustrative instances—

Fig. 1 is a vertical section, partly in elevation, through a water gas set adapted to practice the process of this invention;

Fig. 2 is a vertical section, partly in elevation, of a water gas set in which a carburetor of a different type from that of Fig. 1 is utilized; and Fig. 3 is a vertical section, partly in elevation, of a water gas set in which the generator, carburetor and superheater are combined in one shell, and which is adapted to carry out the process of this invention.

Referring to the drawings, in which like reference numerals indicate like parts, there is shown in Fig. 1 a water gas set comprised of a generator 1, carburetor 2, and superheater 3. The carburetor 2 is properly elevated so that its base is substantially in the same horizontal plane with the outlet 3 of the generator. Outlet 3' communicates with the base inlet 4 of carburetor 2 by means of a refractory lined passageway 5, having a valve 10 therein for controlling flow therethrough. Generator 1 is equipped with the usual grade 6 for supporting a bed of fuel such as coal or coke. Outlet 7 below the grate 6 is connected by passageway 8 having valve 9 therein controlling the flow therethrough, with passageway 11 communicating with the base of the carburetor. Generator 1 has a fuel charging opening 12 adapted to be closed by a suitable closure 12', and is equipped with steam inlets 13, 14 disposed beneath the grate and above the top of the fuel bed respectively. The generator also has air inlet 15 disposed beneath the grate for supplying blasting air thereto. An oil spray 17 leads into the top of the generator above the fuel bed to supply oil during the water gas making step if desired.

The carburetor 2 is provided at its base with two or more layers of checkerbrick 18 resting on arches 19 positioned at the bottom of the carburetor. The portion of the carburetor above the checkerbrick 18 is unobstructed, i. e., is devoid of checkerbrick. A water cooled oil spray 21 is disposed at the top of the carburetor on the vertical axis thereof, and is arranged to supply oil to the carburetor during the water gas making steps in a direction countercurrent to the upward flow of water gas through the carburetor. A header 22, provided with upwardly directed pipes 23, is arranged to supply secondary air to the base portion of the carburetor. The top of the carburetor is provided with gas outlet 24 which communicates with the refractory lined conduit 25 leading into the top of the superheater 3.

Checkerbrick 26 substantially completely fills the superheater 3 and rests on the arches 27 disposed at the base of the superheater. Gas outlet 28 of the superheater leads into a vertical refractory lined stack 29, provided with a suitable stack valve (not shown). A conduit 31 leads from stack 29 into the washbox 32. A gas offtake 36 leads from the washbox to the usual purification equipment.

The carburetor of Fig. 1, it will be noted, has a relatively small number of layers, e. g., two, of checkerbrick at the base and the remainder of the carburetor above the checkerbrick is unobstructed. If desired, the carburetor may be filled with checkerbrick or a carburetor such as shown in Fig. 2 or other suitable type of carburetor may be used. Carburetor 2 of Fig. 2 is provided with a plurality of baffles or partitions 41, 42, 43, 44, extending from one side wall toward the opposite wall of the carburetor, leaving a large unobstructed space of a cross-sectional area at least equal to the cross-sectional area of the inlet 5 to the carburetor. Baffles 41, 43 extend from the side wall 45 of the carburetor and are inclined upwardly. These baffles are preferably constituted of refractory brickwork and extend partially across the carburetor, the lower baffle 41 causing the gas entering the carburetor at the base thereof to sweep along the base until it reaches the opening 46 through which it passes. Baffles 42, 44 extend from the opposite side wall 47 in a general downward direction, and, like the baffles 41, 43, extend partially across the carburetor. It will be appreciated that with this arrangement of baffles the gas is caused to flow in a circuitous or meandrous path through the carburetor, the general direction of flow being upward. Thus there is provided an extended path of flow through the carburetor; the gases passing through this path being subjected to radiant heat emanating from the baffles 41 to 44 and the side walls and dome of the carburetor. An oil spray 48 is disposed at the base of the carburetor beneath the baffle 41 and introduces atomized oil into the gas stream as it enters through inlet 4, the atomized oil mixing with the water gas and passing therewith through the extended path hereinabove described.

In the set of Fig. 2 air for blasting the fuel bed may be supplied through main 84 and secondary air admitted to the carburetor by means of pipe 85.

Superheater 3 of the carbureted water gas set of Fig. 2 may be provided with an oil spray 48' for spraying oil onto the checkerbrick therein during the carbureted water gas making steps. We have found that the carbon formed on the checkerbrick in the superheater by decomposition of oil sprayed thereonto functions to catalyze the decomposition of fiber hydrocarbons in the carbureted water gas to lower hydrocarbons such as methane, resulting in the production of a fixed combustible gas of high B. t. u. value. It will be understood that the function of the oil spray 48' is primarily to introduce enough oil in the superheater to result in the formation of carbon deposits on the checkerbrick therein to catalyze the decomposition of higher hydrocarbons in the water gas. The amount of oil introduced through oil spray 48' is controlled to form the desired surface layer of carbon on the checkerbrick and to avoid carbon formation to an extent such that clogging of the flues through the checkerbrick is avoided.

In lieu of the refractory lined stack 29 of Fig. 1, the set of Fig. 2 is provided with a stack pipe 49 which communicates with the base outlet 28 of the superheater. A valve 50 in stack 49 controls flow therethrough, so that when this valve is open during the blasting step flow of blast gases through the stack to the atmosphere takes place, and when closed during the carbureted water gas making step, carbureted water gas passes through stack pipe 49 through connection 51 into the washbox 32.

The apparatus of Fig. 3 has a generator 1, carburetor 2 and superheater 3, arranged in one shell, with the carburetor 2 and superheater 3 superimposed on the generator. Generator 1 is equipped with fuel charging inlets 12'. The carburetor 2 of Fig. 3 is of substantially the same design as that of Fig. 2, except that the oil spray 48'' is disposed at the top of the carburetor and not at the base, as in the case of Fig. 2. The top of generator 1 of Fig. 3 is defined by a refractory dome 52 on which rests a refractory partition 53 defining a side wall of the carburetor 2 and superheater 3, the partition 53 terminating short of the top 54 of the single shell to provide a passageway 55 connecting the carburetor 2 with the superheater 3.

Arches 56, 57, provided with channels 58 therein, define chambers 59, 61 above the dome 52 of the generator. Chamber 59 is in communication with the carburetor 2 through the channels 58, whereas chamber 61 is in communication with the base of the superheater 3 through the channels 58 extending through the arch 57. Air for blasting the fuel bed may be supplied through main 62 having an inlet 63 leading into the base of the generator. A branch pipe 64 having valve 65 therein leads into a main 66 which communicates with the chamber 59 beneath the carburetor. Secondary air may be admitted into chamber 59 by means of branch pipe 64. Steam may be supplied to the generator through a main 67 having branches 68, 69, each provided with a valve 71 for controlling flow therethrough. Branch 68 leads into the top of the generator above the top of the fuel bed therein, while branch 69 leads into the base of the generator beneath the grate, not shown.

Gas offtake 73 at the bottom of the generator is equipped with a valve 74 and leads into T connection 75 which communicates with the main 66. A second gas offtake 76 leads from the top of the generator into the connection 75. Valve 77 controls flow of uprun gas through conduit 76 into connection 75, main 66, into chamber 59.

A takeoff main 78 leads from the chamber 61 beneath the superheater into stack pipe 79. Washbox 32 communicates with stack pipe 79 by conduit 81. Washbox 32 is equipped with the usual takeoff pipe 36. Stack pipe 79 is equipped with a stack valve 50.

It will be understood that the superheater 3 of Fig. 3 will be substantially filled with checkers resting on arch 57 corresponding to the checkers 26 of Figs. 1 and 2.

An illustrative cycle of operation of the sets hereinabove described includes the following steps:

(a) The fuel bed is first blasted with air or other oxygen-containing gas introduced at the bottom of the generator beneath the grate and passed up through the fuel bed until the latter is brought to an incandescent state. The blast gases pass from the top of the generator into the base of the carburetor where secondary air is admitted through pipes 23 in the case of the apparatus of Figs. 1 and 2, and through branch pipe 64 in the case of the apparatus of Fig. 3. The mixture of air and blast gases is ignited in the carburetor upon passing over the checkerbrick 18 (Fig. 1), under and over the baffle 41 (Fig. 2), through the arch 56 (Fig. 3) and flows upwardly through the carburetor, burning therein, down through the superheater, leaving the superheater through the stack, the gases being discharged into the atmosphere. Thus the carburetor and superheater are heated to the desired temperatures for carbureting and fixing the water gas.

(b) At the completion of this blasting step which may be of approximately 105 seconds duration, steam is passed up through the fuel bed in the generator into the base portion of the carburetor. Gas oil is simultaneously atomized and introduced into the carburetor into the flowing stream of water gas passing upwardly therethrough. If desired, a portion of the oil may be introduced onto the fuel bed of the generator through oil spray 17 and the remainder through the oil spray in the carburetor, or all the oil may be introduced into the upwardly flowing water gas stream through the spray disposed in the generator, or all the oil may be introduced into the carburetor. The thus carbureted water gas flows up through the carburetor and into and down through the superheater, leaving the superheater and passing through the stack pipe into the washbox 32. During the uprun step and the downrun step (d) hereinafter described oil may be admitted to the superheater in amount to form a surface layer of carbon on the checkerbrick which, as above pointed out, functions to catalyze the decomposition of higher hydrocarbons and results in the production of a fixed combustible gas.

(c) At the completion of this uprun carbureted water gas making step, which may be of approximately 90 seconds duration, steam is passed down through the fuel bed, the resultant water gas introduced into the base of the carburetor where it is admixed with secondary air introduced through pipes 23 in the case of the apparatus of Figs. 1 and 2, or through branch pipe 64 in the case of the apparatus of Fig. 3. This secondary air supports combustion of the water gas which in burning, as it passes up through the carburetor and down through the superheater, reheats these chambers to a temperature suitable for gasification of hydrocarbon oil and fixing the resultant carbureted water gas. This step may be of 40-45 seconds duration.

(d) A downrun of steam through the fuel bed (which may be of 45-60 seconds duration) is then performed, the resultant water gas passing up through the carburetor where it is enriched by means of oil introduced through the oil spray disposed in the carburetor. The carbureted water gas passes up through the carburetor and down through the superheater, being fixed in the latter chamber. The carbureted water gas leaves the superheater through the stack pipe, passes into the washbox and is eventually mixed with the carbureted water gas made during the uprun step (b). This mixture of gases will have the desired high B t. u., i. e., a B. t. u. equal to that of natural gas so that it can be efficiently burned in appliances adjusted for burning natural gas, and hence can be substituted for natural gas or mixed with natural gas. If a gas of lower gravity is desired, oil may be added through spray 17 to the downrun steam. Substantially complete decomposition of the oil to hydrogen and carbon takes place as it passes through the fuel bed in the generator, resulting in a lower gravity carbureted water gas as compared with the gravity of the uprun gas. This downrun low gravity carbureted water gas is passed through the carburetor, where it is enriched with oil introduced thereinto, the resultant carbureted water gas being fixed by passage through the superheater.

In the drawings solid line arrows indicate the direction of flow of gases from the fuel bed in steps (a) and (b) and broken line arrows indicate the direction of flow of gases in steps (c) and (d).

In the claims it will be understood that the term "air" is used for the sake of convenience, and includes oxygen or any oxygen-containing gas suitable for supporting combustion of carbonaceous material.

What we claim is:

1. A process of making high B. t. u. carbureted water gas in a set comprising a generator containing a bed of fuel, a carburetor connected to the generator and a superheater connected to the carburetor which comprises the following steps: (a) blasting the fuel bed with air and burning the resultant blast gases in the carburetor and superheater to heat these chambers; (b) discontinuing the aforesaid blasting step, passing steam up through the fuel bed and passing the resultant water gas into the carburetor while simultaneously introducing hydrocarbon oil into the water gas, passing the mixture of oil gas and water gas through the superheater to fix the carbureted water gas, the amount of oil introduced being sufficient to produce a gas having a B. t. u. content substantially in excess of 540 per cubic foot; (c) discontinuing the aforesaid carbureted water gas making step and passing gas making fluid of the group consisting of steam and air down through the fuel bed, introducing the resultant gas into the carburetor, adding secondary air to the gas to support combustion thereof and burning the gas as it passes through the carburetor and superheater to heat these chambers to a temperature suitable for effectively cracking gas oil; (d) discontinuing step (c) and passing steam down through the fuel bed and passing the resultant water gas through the carburetor while introducing oil into the water gas to carburet the gas and passing the resultant mixture of oil gas and water gas through the superheater to fix the gas and to produce a carbureted water gas having a B. t. u. content substantially in excess of 540 per cubic foot and mixing the gas thus produced with that produced in step (b).

2. A process of making high B. t. u. carbureted water gas in a set comprising a generator containing a bed of fuel therein, a carburetor connected at its base with the generator and a superheater connected at its top to the top of the carburetor comprising the following steps: (a) blasting the fuel bed with air and burning the resultant blast gases in the carburetor and superheater to heat these chambers; (b) discontinuing the aforesaid blasting step, passing steam up through the fuel bed and passing the resultant water gas into the base portion of the carburetor and upwardly therethrough while simultaneously introducing hydrocarbon oil into the carburetor countercurrent to the upflowing water gas to carburet the gas, passing the mixture of oil gas and water gas downwardly through the superheater to fix the carbureted water gas and to produce a gas of a B. t. u. content substantially in excess of 540 per cubic foot; (c) discontinuing the aforesaid carbureted water gas making step and passing steam down through the fuel bed, passing the resultant water gas into the base of the carburetor and upwardly therethrough, adding secondary air to the water gas to support combustion thereof and burning the water gas as it passes through the carburetor and superheater to heat these chambers to a temperature suitable for effectively cracking gas oil; (d) discontinuing step (c), and passing steam down through the fuel bed, introducing the resultant water gas into the base of the carburetor, introducing gas oil into the carburetor countercurrent to the upwardly flowing water gas stream, passing the resultant mixture of oil gas and water gas downwardly through the superheater to fix the gas and to produce a carbureted water gas having a B. t. u. content substantially in excess of 540 per cubic foot and mingling the gas thus produced with that produced in step (b).

3. A process of making high B. t. u. carbureted water gas in a set comprising a generator containing a bed of fuel therein and a carburetor, which comprises blasting the fuel bed and passing the resultant blast gases through the carburetor to heat the carburetor, discontinuing the aforesaid blasting cycle and passing steam through the fuel bed and passing the resultant water gas into and through the carburetor, while simultaneously introducing hydrocarbon oil into the water gas to carburet the water gas, the amount of oil introduced being sufficient to produce a gas of a B. t. u. content substantially in excess of 540 per cubic foot, discontinuing the aforesaid carbureted water gas making step and passing a gas making fluid through the fuel bed in a direction opposite to the direction of flow of the steam through the fuel bed during the preceding step, and burning the resultant combustible gas in the carburetor to reheat the carburetor to a temperature for effectively cracking hydrocarbon oil, and then passing steam through the fuel bed in the same direction of flow as in the preceding step involving the passage of a gas making fluid through the fuel bed and passing the resultant water gas through the carburetor while simultaneously introducing hydrocarbon oil into the water gas to carburet the gas, the amount of oil introduced being sufficient to produce a gas of a B. t. u. content substantially in excess of 540 per cubic foot, and collecting the carbureted water gas thus produced and mingling it with carbureted water gas produced in the preceding step of making carbureted water gas.

4. A process of making high B. t. u. carbureted water gas in a set comprising a generator containing a bed of fuel therein and a carburetor connected with the generator, which comprises blasting the fuel bed with air and passing the resultant blast gases through the carburetor to heat the carburetor, discontinuing the aforesaid blasting cycle, passing steam through the fuel bed and passing the resultant water gas into and through the carburetor while simultaneously introducing hydrocarbon oil into the water gas to carburet the water gas, the amount of oil introduced being sufficient to produce a gas having a B. t. u. content substantially in excess of 540 per cubic foot, discontinuing the aforesaid carbureted water gas making step and passing a gas making fluid from the group steam and air through the fuel bed to produce a combustible gas, and burning the resultant combustible gas in the carburetor to reheat the carburetor to a temperature for effectively cracking hydrocarbon oil, and then passing steam through the fuel bed and passing the resultant water gas through the carburetor while simultaneously introducing oil into the water gas to carburet this gas, the amount of oil introduced being sufficient to produce a gas of a B. t. u. content substantially in excess of 540 per cubic foot.

5. A process of making high B. t. u. carbureted water gas in a set comprising a generator containing a bed of fuel therein and a carburetor connected with the generator which comprises (a) blasting the fuel bed with air and burning the resultant blast gases in the carburetor to heat the carburetor; (b) discontinuing the aforesaid blasting cycle and passing steam through the fuel bed and passing the resultant water gas into and through the carburetor while simultaneously introducing hydrocarbon oil into the water gas to carburet the gas; (c) discontinuing the aforesaid carbureted water gas making step and passing steam through the fuel bed, introducing the water gas into the carburetor, adding secondary air to support combustion thereof and burning the water gas in the carburetor to reheat the carburetor to a temperature suitable for effectively cracking hydrocarbon oil; (d) passing steam through the fuel bed and passing the resultant water gas into the carburetor while simultaneously introducing hydrocarbon oil into the water gas to carburet the gas, the amount of oil introduced being sufficient to produce a gas having a B. t. u. content substantially in excess of 540 per cubic foot; and (e) mingling the carbureted water gas produced in steps (b) and (d).

6. A process of making high B. t. u. carbureted water gas suitable for use as a substitute for natural gas in a set comprising a generator containing a bed of fuel therein, a carburetor connected with the generator, and a superheater containing checkerbrick and connected with the carburetor, which comprises the following steps: (a) blasting the fuel bed with air and burning the resultant blast gases in the carburetor and superheater to heat these chambers; (b) discontinuing the aforesaid blasting cycle, passing steam up through the fuel bed and passing the resultant water gas into the base portion of the carburetor up therethrough, while simultaneously introducing hydrocarbon oil into the water gas to carburet the water gas, passing the mixture of oil gas and water gas through the superheater to fix the carbureted water gas and to produce a gas of a B. t. u. content approximately equal to that of natural gas; (c) discontinuing the aforesaid carbureted water gas making step and passing steam down through the fuel bed, introducing the resultant water gas into the carburetor, adding secondary air to the water gas to support combustion thereof, and burning the water gas as it passes through the carburetor and superheater to heat these chambers to a temperature suitable for effectively cracking gas oil; (d) discontinuing step (c) and passing steam down through the fuel bed, introducing the resultant water gas into the base of the carburetor, introducing gas oil into the water gas stream flowing through the carburetor and passing the resultant mixture of oil gas and water gas through the superheater to fix the gas and to produce a carbureted water gas having a B. t. u. content approximately equal to that of natural gas, and mingling the gas thus produced with that produced in step (b).

7. A process as defined in claim 6 in which oil is added to the superheater during the flow of carbureted water gas therethrough to form a carbonaceous deposit on the checkerbrick therein, which deposit catalyzes the decomposition of the higher hydrocarbon content of the oil used to carburet the water gas.

8. A process as defined in claim 4 in which the carbureted water gas making steps involve the addition of hydrocarbon oil to the steam passed through the fuel bed and to the resultant carbureted water gas during passage thereof through the carburetor.

LEON E. OSMER.
WILLIAM TIDDY.

CERTIFICATE OF CORRECTION.

Patent No. 2,183,845.                                December 19, 1939.

LEON E. OSMER, ET AL.

It is hereby certified that error appears in the printed specification of the above numbered patent requiring correction as follows: Page 2, first column, line 25, for the word "grade" read grate; same page, second column, line 4, for the reference numeral "5" read 4; line 41, for "fiber" read higher; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.